Dec. 8, 1936.  J. B. PARSONS  2,063,049
CONTROL SYSTEM
Filed Oct. 5, 1933  3 Sheets-Sheet 1

Inventor
John B. Parsons
by Roberts, Cushman & Woodberry
Attys.

Dec. 8, 1936.　　　　J. B. PARSONS　　　　2,063,049
CONTROL SYSTEM
Filed Oct. 5, 1933　　　3 Sheets-Sheet 3
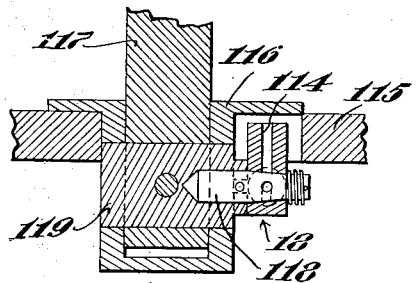
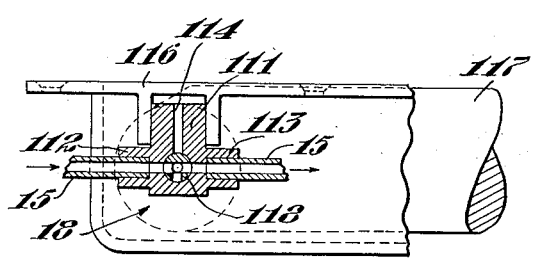
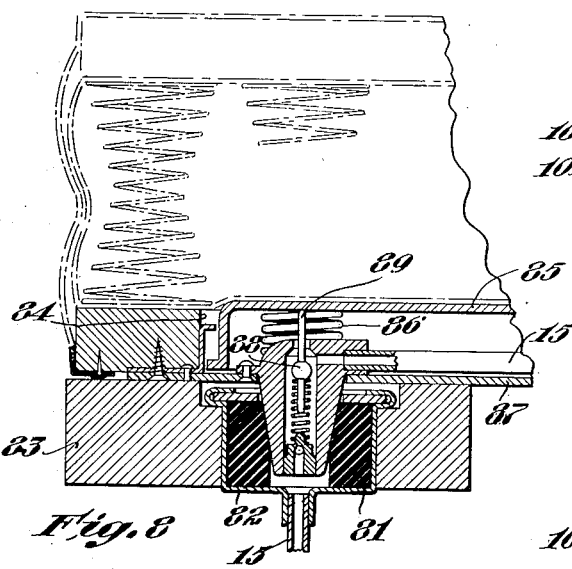
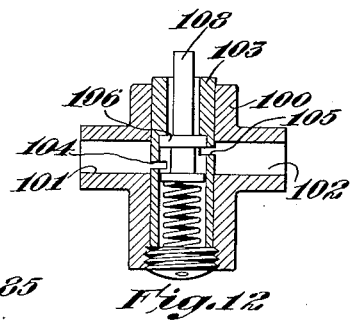
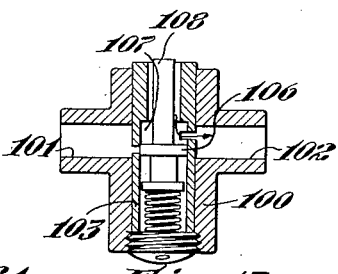
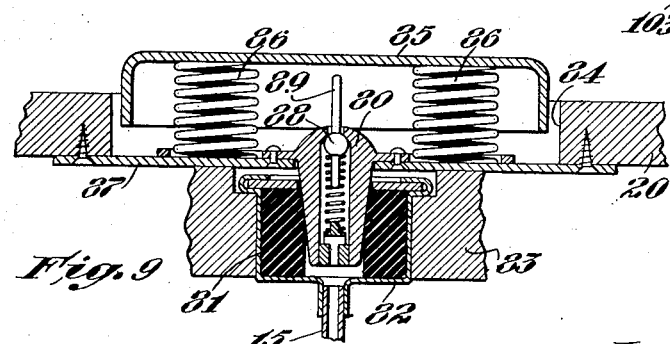
Inventor
John B. Parsons
by Roberts, Cushman & Woodberry
Att'ys.

Patented Dec. 8, 1936

2,063,049

UNITED STATES PATENT OFFICE 2,063,049

CONTROL SYSTEM

John B. Parsons, Arlington, Mass., assignor of sixty per cent to Graydon Stetson, Boston, Mass.

Application October 5, 1933, Serial No. 692,354

29 Claims. (Cl. 235—30)

This invention relates to an automatic control mechanism and more particularly to a taximeter control system which governs the operation of the meter in response to the occupancy of the cab.

Automatic control systems for taximeters and the like devices are primarily designed to protect both the cab owner and passenger from fraudulent practices and carelessness on the part of the operator, and obviously a necessary feature of any such system is that it shall be reliable in operation and "fool-proof", that is, free from the possibility of derangement either intentionally or otherwises, and furthermore, it is highly desirable that it shall be operative in conjunction with the manually operative lever, flag or other means usually provided in the conventional taximeters so that "waiting time" may be recorded during traffic stops and when the passenger has temporarily left the cab, without shutting off and restarting the meter.

The various systems heretofore employed to accomplish these ends have proven generally unsatisfactory due principally to the fact that they may be easily deranged or thrown out of order, accidentally or deliberately, thus either preventing the operation of the meter or in many instances impairing its operation so that it does not record the full charge. A further objectionable feature inherent in many of the prior systems resides in the fact that they are not operative in conjunction with the manually operable controls of the conventional taximeters, and consequently do not permit the manual operation of the meter to record "waiting time."

The principal object of the present invention is to provide a control system for a taximeter or other similarly operated device, which system is free from the aforementioned deficiencies and objectionable features inherent in the prior systems, which is of simple and economical construction, and reliable and efficient in operation, and which may be readily assembled with or built in as an integral part of a taximeter or the like device, and which may be easily installed in vehicles at a relatively low cost.

Another object is to provide a taximeter control system the operation of which is dependent upon both the running of the cab motor and the occupancy of the passenger compartment, and which is designed so that it automatically operates to throw the meter into a recording position in event of a failure of any part of the system properly to function, such as may result either from an accidental derangement of any part of the system or tampering therewith in an attempt to throw the system out of order.

Further objects relate to the operation and construction of my new system and will be apparent from a consideration of the following description and accompanying drawings which exemplify one embodiment of the invention chosen for the purpose of illustrating its utility as applied to a taximeter.

In accordance with the present invention the control system operates in response to any change or variation in a normal or predetermined pressure condition existing within the pressure chamber of the control mechanism, the fluid pressure which operates the control mechanism preferably being derived from the motor or other suitable source controlled thereby. The control mechanism, per se, is preferably attached directly to the actuating lever or flag shaft of the taximeter or other device the operation of which is to be controlled, although it is to be understood that such mechanism may, if desired, be indirectly associated with the actuating lever or other control means as, for example, by employing relay actuators responsive to the operation of the control mechanism. Although the fluid pressure employed to operate the system may be derived from any suitable source, I prefer to utilize the suction created either in the intake manifold or the vacuum tank of the motor, or by a separate vacuum pump operated when the engine is running, although it is to be understood that the system is operative on fluid pressures greater, or less than atmospheric pressure. The term "fluid pressure", as herein used unless limited expressly or by context, not only includes pressures greater than normal atmospheric pressure, but also different degrees of vacuum or suction which may be availed of for use in a manner similar to fluid pressures greater than atmospheric pressure.

The control mechanism comprises any suitable means, such as a cylinder or the like pressure compartment, in which fluid pressure may be applied; a movable part, such as a piston, diaphragm, or plunger, operative in response to predetermined pressure conditions within the cylinder or fluid compartment; and suitable valves for controlling the fluid flow or pressure conditions within the pressure compartment. The pressure compartment is connected to a suitable source of fluid pressure capable of creating a predetermined pressure condition therein. The movable part or piston is associated with the operating shaft or other suitable part of the taximeter, and the valves are associated with the seats in the passenger compartment of the cab and are operated in response to the occupancy of any of the seats. The construction and arrangement of the various parts of the control mechanism is such that when the passenger compartment is unoccupied a predetermined pressure condition exists within the pressure compartment, and the movable part is normally in a "neutral position" wherein the taximeter is non-recording (and, if desired, subject to manual operation), the valves being in such position as to maintain the predetermined pressure condition within the pressure compartment, thus preventing movement of the movable part. The occupancy of the passenger compartment of the cab automatically actuates one or more of the valves, thus effecting a change in the predetermined pressure condition normally existing within the pressure compartment, such change resulting in the movement of the movable part from "neutral position" to a position wherein it effects the actuation of the taximeter by causing the operating lever or shaft to be moved to a recording position. When the cab is unoccupied, the valves are automatically returned to normal position, thus causing the restoration of the normal predetermined pressure condition within the pressure compartment and the return of the movable member to "neutral position" wherein the actuating lever of the taximeter may be swung to either non-recording, waiting, or vacant position. In a control system constructed in accordance with the present invention and operating on a fluid pressure greater or less than atmospheric pressure, an accidental or intentional derangement of any part of the system necessarily effects a change in the normal or predetermined pressure condition within the pressure compartment and consequently causes the actuation of the taximeter controls, thus starting the operation of the meter.

In the drawings:

Fig. 8 is an elevation, partly in section, showing the construction and arrangement of one form of valve device associated with the rear seat of the cab, the valve being shown in open position;

Fig. 9 is a fragmentary view of the valve device shown in Fig. 8, showing the valve in closed position;

Figs. 12 and 13 are sectional views showing a modified form of two-way valve in open and closed positions, respectively; and Figs. 14 and 15 are sectional views showing the construction and arrangement of the valve device associated with an auxiliary seat of the conventional type.

Figure 1:
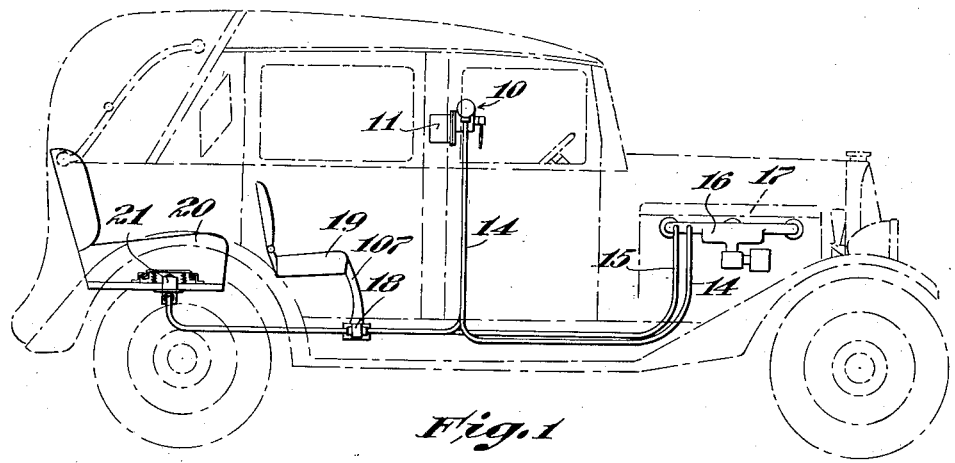
Fig. 1 is a side elevation of a cab or motor vehicle (shown in dotted lines) equipped with a taximeter and control system constructed in accordance with the present invention.
Figure 2:
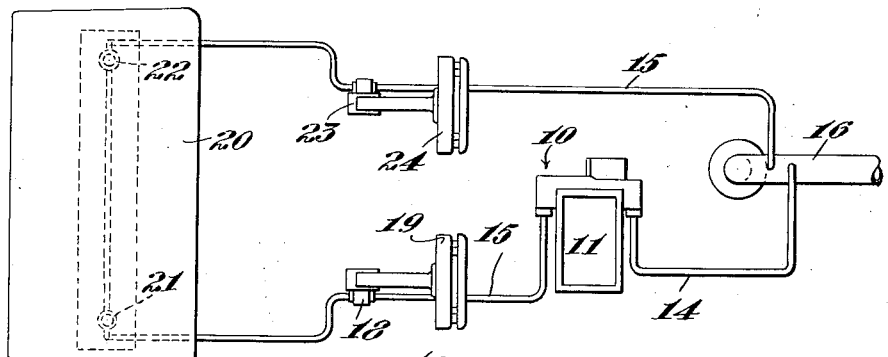
Fig. 2 is a diagrammatic plan view of the system and taximeter shown in Fig. 1.

Referring to Figs. 1 and 2, the control system shown therein comprises a control mechanism, designated generally by the numeral 10, which is associated with a conventional taximeter 11, located at a convenient place between the passenger compartment and front seat of the vehicle. The control mechanism 10 is connected by suitable air-tight pipe lines or ducts 14 and 15 to a fluid pressure supply, here shown as the intake manifold 16 of the engine 17, it being understood that any suitable source of vacuum or suction may be employed. The line 14 runs directly from the control mechanism 10 to the manifold 16 and the line 15 extends rearwardly to the passenger compartment where it connects with a valve 18 associated with an auxiliary seat 19, thence to and along the rear seat 20, connecting with valves 21 and 22, then to a valve 23 associated with the auxiliary seat 24, and from the latter point directly to the manifold 16, as shown in Fig. 2. The lines 14 and 15 may be of any suitable tubular material and are preferably provided with a protective sheathing and concealed in or beneath the partitions and floor boards of the vehicle so as to prevent unauthorized access thereto and protect them from accidental or deliberate injury.

In the particular embodiment herein shown the taximeter 11 is of the conventional type, the operation of which is controlled by the usual flag shaft 30 or other actuating member which may be manually set into one of the three or four usual positions, the first position being flag up (vacant or not hired) at which the meter is non-recording; the second and third positions (hired), being at 90° and 180°, respectively, to the first position, at which both mileage and waiting time are recorded and charged; and the fourth position (hired), diagonally opposite the second position, at which mileage alone may be recorded and charged. These various positions are indicated by the position of the usual flag which provides a manually operable lever for throwing the meter mechanism into any of the aforesaid positions.

Figures 4, 5, 6:
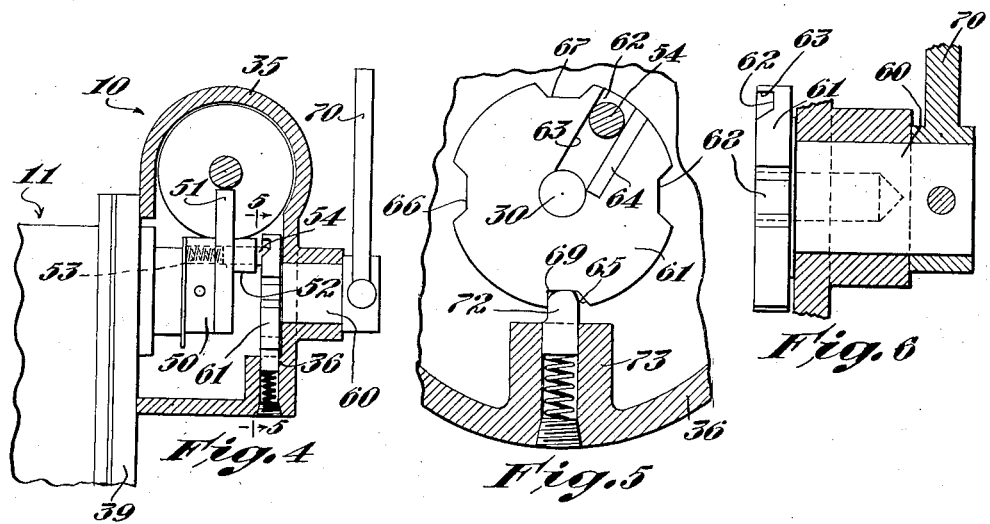
Fig. 4 is a transverse sectional view of the control mechanism.
Fig. 5 is an enlarged fragmentary section on the line 5—5 of Fig. 4.
Fig. 6 is a side elevation of the ratchet member forming part of the operating mechanism.
Figure 3:
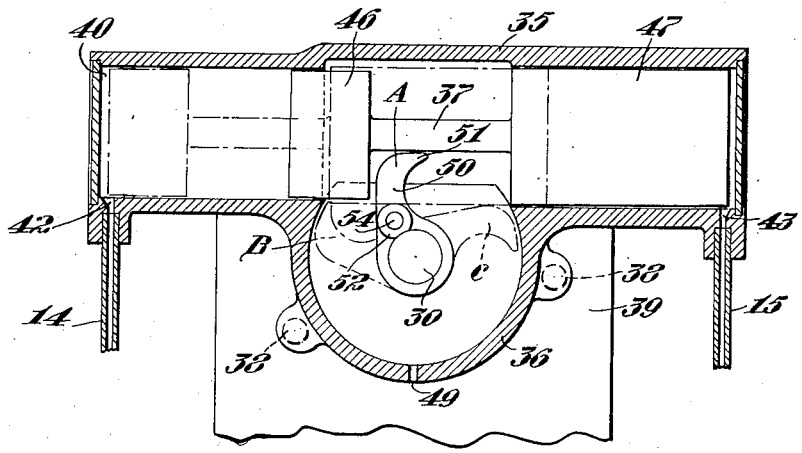
Fig. 3 is a longitudinal sectional view of the control mechanism.

The control mechanism 10 comprises a pressure chamber or cylinder 35, the central portion of which communicates with and is integrally joined to a housing 36 which surrounds the shaft or actuating member 30 of the taximeter, as shown in Figs. 3 and 4. Suitable means such as machine screws 38 (Fig. 3) may be provided to secure the housing and cylinder to the meter housing 39. One end of the cylinder is provided with a larger bore than its opposite end, thus defining pressure compartments 40 and 41 of unequal volume at opposite ends of the cylinder, this construction being the equivalent of a pair of cylinders of different diameters. The compartments 40 and 41 are provided with ducts 42 and 43, respectively, which communicate with the lines 14 and 15, as shown in Fig. 3.

A movable element or piston member, disposed within the cylinder, is provided with a head 46 slidable within the compartment 40, and a head 47 slidable within the compartment 41, the heads being rigidly joined by a rod 37. The skirt of the head 47 is of sufficient length substantially to close the opening between the housing 36 and the central portion of the cylinder 35 when the head 47 is in the operating position, at the left-hand end of its path of movement (Fig. 3), and in order to prevent the piston from creating abnormal pressures within the housing 36 and central portion of the cylinder during movement from one position to another, the housing may be provided with a vent opening 49.

An arm 50, preferably having a curved end portion 51, is pinned or otherwise secured to the shaft 30 so that it projects upwardly into the central portion of the cylinder between the piston heads 46 and 47 when the parts are in non-recording or vacant position. Intermediate the shaft 30 and its end 51, the arm is provided with an annular boss 52 concentric with a bore 53. A spring-pressed plunger 54 is slidably mounted in the boss and bore and is provided with a rounded end portion which projects outwardly from the boss, as shown in Fig. 4. When the arm 50 is in normal or non-recording position A, it may be swung in a counterclockwise direction, as viewed in Fig. 3, to the position B, shown by the broken lines, by left-hand movement of the head 47 as viewed in Fig. 3. Movement of the arm 50 to the position B rotates the shaft 30 sufficiently to throw the meter mechanism to recording position in which both waiting time and mileage are recorded. When the piston head 47 is in operating position at the left-hand end of its path (Fig. 3), the arm 50 can not be swung clockwise back to normal position A, nor can it be swung in a counterclockwise direction completely back to position A, due to its engagement with the skirt of piston 47. In this particular embodiment the parts are designed to permit the meter to be thrown to the fourth flag position, thus complying with traffic regulations of certain cities which forbid the operator of a cab to charge for waiting time during traffic stops and delays. To this end the width of the arm 50 is such that it may be swung to the position C, at which no waiting time is charged, further movement of the arm in a counterclockwise direction being prevented as above explained.

A stub shaft 60 (Fig. 6) is journaled in the side of the housing 36, preferably in alignment with the shaft 30, and a ratchet 61 is rigidly secured to its inner end as shown in Fig. 4. The ratchet 61 is provided with a radially extending slot or recess 62, having a straight edge 63 providing an abutment, and a beveled edge 64 (Fig. 5). The periphery of the ratchet is provided with notches 65, 66, 67 and 68 spaced approximately 90° apart, each having beveled or inclined edges with the exception of the notch 65 which is provided with a straight edge 69 as shown in Fig. 5. A flag 70 or the like actuating lever is pinned or otherwise secured to the outer end of the stub shaft 60 which projects outwardly beyond the housing. A spring-pressed plunger or pawl 72, mounted in a recess in a boss 73 integral with the housing 36, is arranged to engage the periphery of the ratchet 61 so that its rounded end drops into one of the recesses in the periphery of the ratchet to hold it in one of the four positions corresponding to the aforesaid flag positions. The construction of the arrangement of the parts is such that when the flag 70 is up, that is, in vacant or non-recording position, the plunger 54 is disposed in the slot 62 and the pawl 72 projects into the recess 65. Movement of the flag in a clockwise direction, as viewed in Fig. 3, (counterclockwise as viewed in Fig. 5) is prevented by the engagement of the pawl 72 with the straight edge 69 of the recess 65. However, the flag may be swung in the opposite direction, thus rotating the ratchet 61 and causing the arm 50 to swing in a counterclockwise direction (Fig. 3), due to the engagement of the plunger 54 with the straight edge 63. Once the arm 50 has been swung into the second position (B) by either the piston 47 or the ratchet 61, reverse movement of the flag is ineffective to cause a reverse movement of the arm 50 from the position B back to the position A, due to the engagement of its end 51 with the skirt of piston 47 or the skirt of piston 46 in event the seats of the cab are not occupied. Forcing the flag back to vacant position merely causes the plunger 54 to ride over the beveled edge 64 of the ratchet and consequently does not effect the actuation of the shaft 30. With the parts in the position shown by the dot and dash lines of Fig. 3, the flag and arm may be manually swung from position A to either the second, third or fourth positions and from the third and fourth positions back to the second position, the plunger 54 being effective to hold the arm in engagement with the ratchet 61 during reverse movement of the flag 70 from the fourth position to the second.

Figure 7:
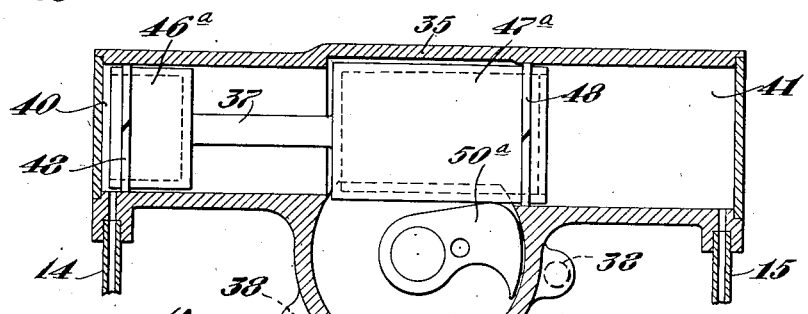
Fig. 7 is a view similar to Fig. 3 showing a control mechanism of modified construction.

In the embodiment shown in Fig. 7 the construction and arrangement of the parts are substantially the same as in the previously described embodiment. However, the smaller piston or head 46ª is hollow and its outer end is open. The larger piston or head 47ª is likewise hollow and is provided with closed ends. If desired, both pistons may be provided with rings 48. The end of the arm 50ª is considerably wider than the corresponding portion of the arm 50 so that when the parts are in the position shown in Fig. 7, the arm 50ª can not be swung completely around to the fourth flag position, due to its engagements with the skirt of piston 47ª. This arrangement is particularly designed for use on cabs in cities where it is customary to charge for waiting time during traffic stops and delays, and thus prevents the meter from being thrown into the fourth position at which waiting time is not recorded.

In the constructions shown in both Figs. 3 and 7, equalized or balanced pressure conditions in the compartments 40 and 41, if greater or less than the atmospheric pressure, cause the piston member to move to the right and to be held at one end of the cylinder 35, due to the fact that the total pressure upon one end of the piston is greater than at the other. By unbalancing the pressure conditions within the compartments 40 and 41, a resultant unbalanced force may be created which is effective to move and hold the piston member at the opposite end of the cylinder, and upon the restoration of the pre-existing or balanced pressure conditions within the compartments, the piston member returns to its former position wherein it is held so long as the balanced pressure conditions prevail. The particular construction herein shown is designed for use with pressures less than atmospheric pressure, herein refered to as suction or vacuum, and consequently equalized or balanced vacuums in the compartments 40 and 41 cause the piston member to move and be held in normal or right-hand position (Fig. 3), and unbalanced vacuums in compartments 40 and 41 cause the piston member to move to the left and thus effect the actuation of the meter mechanism.

The valve devices 21 and 22 associated with the rear seat 20 may be of any suitable design operative to open the line 15 when the seat is occupied, such, for example, as the type shown in Figs. 8 to 13. In the embodiment shown in Figs. 8 and 9, the valve comprises a conical or cylindrical member 80 having an axial passage, communicating at its lower end with that branch of duct 15 which leads from the control mechanism 10, said passage having a lateral outlet near its upper end which connects with the other branch of duct 15 leading back to manifold 16. The member 80 fits snugly in the opening of an annular washer 81, which may be of any suitable material such as rubber, disposed in a casing 82. The casing 82 is secured in a suitable opening adjacent to one end of the seat support 83 and is connected to the inlet side of line 15. The bottom of the seat 20 is provided with an elongate recess 84 which receives a channel member 85, and suitable springs 86 tend to hold the channel member in predetermined spaced relation to a plate 87 to which the valve 80 is secured. The springs 86 are sufficiently strong to carry the weight of the channel member, cushion spring assembly, padding, covering. etc., but are compressed when additional weight is added, so that the channel member is depresed to the position shown in Fig. 8. Suitable stops and guides may be provided to hold the channel member 85 in operative position and limit its upward movement. A spring-pressed ball 88 is arranged to engage an annular seat in the upper portion of the axial passage in valve member 80 and below the lateral outlet and normally closes the passage as shown in Fig. 9. A valve stem 89 carried by the ball 88 projects upwardly through the opening in the top of the member 80 to a point in close proximity to the channel member 85.

When the seat 20 is unoccupied, the valve and associated parts are in the position shown in Fig. 9 with the ball 88 seated and closing the upper end of the passage through the valve, thus providing an unbroken and an air-tight communication between the inlet and outlet ends of the line 15. When the seat 20 is occupied, the channel member 85 is depressed so as to engage the valve stem 89 and unseat the ball 88 as shown in Fig. 8, thus admitting air through the upper end of the valve passage to the line 15.

Figures 10, 11:
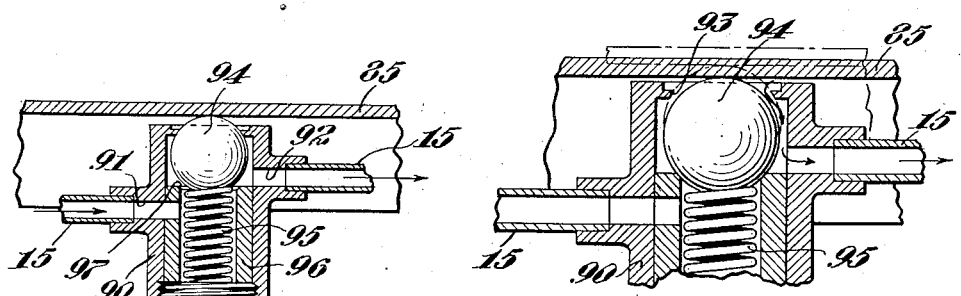
Fig. 10 is a sectional view showing a preferred form of two-way valve, the valve being shown in closed position.
Fig. 11 is an enlarged section similar to Fig. 10, but showing the valve in open position.

The embodiment shown in Figs. 10 and 11 is a preferred form of two-way valve which may be secured to the seat support 83 in a manner similar to that shown in the previously described embodiment. This valve device comprises a cylindrical member 90 having lateral ports 91 and 92 communicating respectively with the inlet and outlet ends of the line 15; an annular flange at its top providing a valve seat surrounding opening 93; a spherical valve member or ball 94 cooperating with the valve seat of opening 93 and normally held in closed position by the spring 95 which is seated against the closed end of the member 90, and a sleeve member 96 disposed within the cylinder to provide an annular valve seat 97. The upper part of the ball 94 is normally disposed closely adjacent to the channel member 85 and when the seat is unoccupied, the parts are in the position shown in Fig. 10 with the ball 94 closing the opening 93 and thus insuring an air-tight communication between the inlet and outlet ends of the line 15. When the seat is occupied, the channel member 85 is depressed and moves the ball downwardly against the valve seat 97, thus opening the outlet end of line 15 and at the same time closing the inlet end, as shown in Fig. 11. With this construction and arrangement the springs 95 are also used to support the channel member 85, thus dispensing with the necessity of using the springs 86 shown in the previously described embodiment, and by thus eliminating all clearance between the body portion of the channel member 85 and the stem or upper part of the valve member or ball 94, a greater sensitivity in the action of the valves is secured.

In Figs. 12 and 13 I have shown a further modification of a two-way valve device which comprises a cylindrical member 100 having lateral ports 101 and 102, a sleeve 103 fitting within the cylinder and having circumferentially extending slots 104 and 105 registering respectively with the ports 101 and 102, a spring-pressed valve member 106 normally acting against an annular seat 107 in the upper part of the sleeve 103, and a valve stem 108 projecting upwardly through the opening in the sleeve as shown in Fig. 12. The valve device may be assembled with the seat structure and support in the manner previously described so that when the seat is unoccupied the parts are in the position shown in Fig. 12. When the seat is occupied the stem and valve head are pushed downwardly into the position shown in Fig. 13, thus closing the port 101 and opening a communication between the port 102 and the opening above the seat 107.

In each of these embodiments the parts are automatically restored to their normal positions when the seat is unoccupied. Preferably the location of the vent opening (which provides a communication between the outlet end of the line and the atmosphere) in each valve is such that extraneous objects can not be forced, accidentally or otherwise, up in the valve so as to prevent its proper operation.

The valve devices 18 and 23, associated with the auxiliary seats 19 and 24, are of the same construction and preferably consist of two-way valves of the rotary plug type. As shown in Figs. 14 and 15, each valve comprises a cylindrical body portion 111 having aligned lateral ports 112 and 113 communicating respectively with the inlet and outlet ends of the line 15, and an opening or port 114 at the top. The body portion 111 is disposed beneath the floor 115 of the vehicle and may be held in fixed position by a socket 116 which receives the pivoted end of the supporting arm 117. A two-way rotary valve plug 118 is rigidly secured in concentric relation to the pivot pin 119 of the supporting arm, as shown in Fig. 14. When the auxiliary seat is folded down, the supporting arm 117 lies in a horizontal position and the valve parts are in the position shown in Fig. 15. When the seat is raised for occupancy, the supporting arm 117 is swung upwardly and rotates the valve 118 through an angle of 90°, thus shutting off the port 112 on the inlet side of line 15 and opening the port 114 so as to provide communication with the outlet port 113.

It will be noted that the construction and arrangement of the seats in the passenger compartment is such that they may be removed for the purposes of cleaning and repair without deranging any part of the system. Such work may be done while the engine is not running without effecting the operation of the control mechanism.

The operation of my new system is as follows: When the motor 17 of the vehicle is shut off, the pressure condition within the lines 14 and 15 and the cylinder 35 is such as not to cause the actuation of the control mechanism, and with the seats 19, 20 and 24 unoccupied, the respective valves associated therewith are in the positions shown in Figs. 9 and 15, thus providing free but air-tight communication between the compartments 40 and 41 and the manifold 16. When the motor is started a suction or vacuum is created in the manifold 16, which tends to evacuate the compartments 40 and 41. The pressure conditions thus created in the compartments 40 and 41, although balanced, nevertheless cause the piston members to move to the right (Figs. 3 and 7) and to be held in this normal position. The normal position of the piston member and balanced pressure conditions in the compartments 40 and 41 continue to prevail so long as neither lines 14 and 15 are open to atmospheric pressure, and consequently the operator of the cab may take his place in the front seat and drive off without causing the actuation of the control mechanism 10.

When a passenger takes his place in either the rear seat or one of the auxiliary seats, the valve mechanism associated with the seat occupied automatically opens the line 15 and breaks the vacuum therein. Consequently the pre-existing balanced pressure conditions within the compartments 40 and 41 are changed so that the piston member moves to the left from the normal position of Figs. 3 and 7, thus swinging the arm 50 from non-recording position to recording position, at which the meter mechanism is set in operation to record both mileage and waiting time. Any attempt on the part of the operator to prevent movement of the arm 50 and consequent actuation of the meter mechanism, as by holding the flag in vertical position, is ineffective as the force exerted by the piston on the arm is sufficient to cause the plunger 54 to ride over the beveled surface of the ratchet 61. If, however, the operator chooses to throw the meter mechanism into operation before the passenger takes his seat in the passenger compartment, he may do so, and upon occupancy of the seat the movement of the piston is effected, as previously explained. When the meter mechanism has been thrown into operation, the operator can not shift the flag so as to reverse the arm 50 or swing it completely around to normal position as long as any of the seats are occupied, and consequently no unauthorized use of the seats of the passenger compartment can be made while the motor is running without setting the meter into operation to record a charge for which the operator is responsible.

When the seats in the passenger compartment are vacated the valves automatically close the line 15, as previously explained, and the pre-existing pressure conditions are restored throughout the system and the equalized or balanced pressure conditions within the compartments 40 and 41 again prevail, thus effecting the return of the piston member to its normal position.

When a passenger hires the cab and the meter mechanism has been thrown into operation, either automatically or manually, and at some stage of the trip desires to leave the cab temporarily, no manipulation of the flag is necessary to charge waiting time, since the reverse movement of the piston resulting from vacating the passenger compartment will not shut off the meter, and consequently only waiting time will be charged. When the passenger returns and takes his seat, the control mechanism is automatically reset and the driver may continue the journey. In localities which do not permit waiting time to be charged during delays in traffic, the driver may swing the flag to the fourth position (C) (Fig. 3) at which mileage alone is charged. Should the driver inadvertently or intentionally neglect to reset the meter after starting up, it will nevertheless record mileage.

In localities which permit waiting time to be charged during traffic delays, the control mechanism shown in Fig. 7 may be advantageously employed, it being noted that this mechanism has only two effective positions, that is, recording and non-recording. With this type of control mechanism the operator can not throw the meter shaft completely around to the fourth position when the passenger compartment is occupied, and any attempt to do so is futile, due to the "blocking action" of the piston 47. Accordingly, when the engine is running and the passenger compartment is occupied, regardless of whether or not such occupancy is authorized, the meter is automatically thrown to recording position, and consequently the operator may be held accountable for such occupancy. When the occupant leaves the cab, the piston is automatically returned to normal position, thus permitting the operator to move the flag either to the fourth or vacant position.

If any attempt is made to derange or throw the system out of order, such as might result either from puncturing or collapsing the line 15, or should a leak accidentally develop in this line or any of the valves, then when the engine is started the piston will move to recording position, due to the unbalanced pressure conditions which will necessarily exist within the compartments 40 and 41, thus causing the meter to be thrown into operation. Consequently, the operator, upon noting such a condition, is obliged immediately to notify the company of the trouble before using or driving off with the cab, otherwise he may be held accountable for all charges recorded by the meter.

From the foregoing it is apparent that a control system constructed in accordance with the present invention is not only efficient and reliable in operation, but is substantially fool-proof and prevents fraudulent practices on the part of the operator. Furthermore, the operation of the system is such that any unauthorized use of the passenger compartment while the engine is running will be recorded and chargeable as waiting time, and hence the various forms of gratuitous use of the vehicle heretofore possible, cannot be availed of without setting the meter into operation.

While I have shown and described different desirable embodiments of the present invention, it is to be understood that this disclosure is for the purpose of illustration only, and that various changes in shape, proportion, and arrangement of parts, as well as the substitution of equivalent elements for those herein shown and described, may be made without departing from the spirit and scope of the invention as set forth in the appended claims.

I claim:

1. The combination with a vehicle having a meter or the like device provided with a control member movable from an inoperative position to an operative position, of a system for controlling the operation of the control member comprising a pressure compartment, means for applying fluid pressure to said compartment to create a predetermined pressure condition therein, means movable from one position to another in response to a change in the pressure condition within said compartment, connections between said movable means and the control member operative in one direction of movement to effect the movement of the control member from an inoperative position to an operative position, and means automatically operative to control the pressure conditions within said compartment in response to occupancy of the vehicle, thereby to effect the movement of said control member from inoperative position to an operative position.

2. The combination with a vehicle having a meter or the like device provided with a control member movable from non-recording position to a recording position, of a system for controlling the operation of the control member, comprising a pressure compartment, means for applying fluid pressure to said compartment to create a predetermined pressure condition therein, an element within said compartment movable from a normal position to an operating position in response to a change in the pressure condition within said compartment, connections effective in one direction of movement between said control member and movable element for moving the former from non-recording position to a recording position in response to movement of the latter from normal to operating position, and means automatically operative in response to the occupancy of the vehicle for effecting a change in the pressure condition within said compartment.

3. The combination with a vehicle having a meter or the like device provided with a control member movable from non-recording position to a recording position, of a system for controlling the operation of the control member, comprising a cylinder, a piston within said cylinder defining pressure compartments therein, means for applying a fluid pressure to one of said compartments to create a predetermined pressure condition therein relative to the other of said compartments, said piston being movable from one position to another in response to relative changes in pressure conditions within said compartments, connections effective in one direction of movement of said piston between said piston and control member for controlling the movement of the latter, and valve means automatically operative in response to the occupancy of the vehicle for effecting a relative change in the pressure conditions within said compartments.

4. The combination with a vehicle having a meter or the like device provided with a control member movable from non-recording position to a recording position, of a system for controlling the operation of the control member, comprising a cylinder, a piston within said cylinder defining pressure compartments adjacent to opposite ends thereof, means for applying a fluid pressure to each of said compartments to create predetermined pressure conditions therein, said piston being movable from one position to another in response to relative changes in pressure conditions within said compartments, connections effective in one direction of movement of said piston between said piston and control member for controlling the movement of the latter, and valve means automatically operative in response to the occupancy of the vehicle for effecting a relative change in the pressure conditions within said compartments.

5. The combination with a vehicle having a meter or the like device provided with a control member movable from non-recording position to a recording position, of a system for controlling the operation of the control member, comprising a cylinder, a piston within said cylinder and defining therewith pressure compartments of unequal cross-sectional area at opposite ends thereof, means for applying fluid pressure to one of said compartments to create a predetermined pressure condition therein relative to the other of said compartments, said piston being movable within said cylinder from one position to another in response to relative changes in pressure conditions within said compartments, connections between said piston and control member for controlling the movement of the latter, and valve means automatically operative in response to the occupancy of the vehicle for effecting a relative change in the pressure conditions within said compartments.

6. The combination with a vehicle having a meter or the like device provided with a control member movable from non-recording position to a recording position, of a system for controlling the operation of the control member, comprising a cylinder, a piston within said cylinder and defining therewith pressure compartments of unequal cross-sectional area at opposite ends thereof, means for applying fluid pressure to each of said compartments to create balanced pressure conditions therein, said piston normally being at one end of said cylinder when the pressure conditions within said compartments are balanced and being movable from said end toward the opposite end in response to unbalanced pressure conditions within said compartments, connections between said piston and control member for controlling the movement of the latter, and valve means automatically operative in response to the occupancy of the vehicle for effecting an unbalanced pressure condition within said compartments.

7. In a vehicle having a control member movable from one position to another to effect the operation of a mechanism carried by the vehicle, a system for controlling the operation of said control member, comprising a pressure compartment, means for applying fluid pressure to said compartment to create a predetermined pressure condition therein, means associated with said compartment and movable from one position to another in response to a change in the pressure condition within said compartment, connections effective in one direction of movement between said movable means and control member operative to control the operation of the latter, and means automatically operative in response to the occupancy of the vehicle for effecting a change in the pressure condition within said compartment.

8. In a vehicle having a control member movable from one position to another to effect the operation of a mechanism carried by the vehicle, a system for controlling the operation of said control member, comprising a cylinder, a piston within said cylinder defining pressure compartments therein, means for applying a fluid pressure to one end of said compartments to create a predetermined pressure condition therein relative to the other of said compartments, said piston being movable from one position to another in response to relative changes in pressure conditions within said compartments, connections effective in one direction of movement of said piston between said piston and control member operative to control the operation of the latter, and means automatically operative in response to the occupancy of the vehicle for effecting a relative change in the pressure conditions within said compartments.

9. In a vehicle having a control member movable from one position to another to effect the operation of a mechanism carried by the vehicle, a system for controlling the operation of said control member, comprising a cylinder, a piston within said cylinder and defining therewith pressure compartments of unequal cross-sectional area at opposite ends of said cylinder, means for applying fluid pressure to each of said compartments to create balanced pressure conditions therein, said piston normally being at one end of said cylinder when the pressure conditions within said compartments are balanced and being movable from said end toward the opposite end in response to unbalanced pressure conditions within said compartments, connections between said piston and control member for controlling the operation of the latter, and means automatically operative in response to the occupancy of the vehicle for effecting an unbalanced pressure condition within said compartments.

10. In a system of the character described, the combination with a meter having a control member movable from non-recording position to a recording position, of a control mechanism comprising a pressure chamber, movable means within said chamber defining therewith pressure compartments of unequal cross-sectional area, means for applying fluid pressure to said compartments to create predetermined pressure conditions therein, said movable means being disposed in a predetermined position within said chamber when the pressure conditions in said compartments are balanced and movable from said position to another position in response to unbalanced pressure conditions, an arm associated with said movable member and said control member, said arm being operative to move said control member from non-recording position to a recording position in response to movement of said movable member from said predetermined position, and valve means associated with said chamber for controlling the pressure conditions in said compartments.

11. In a system of the character described, the combination with a meter having a control member movable from non-recording position to a recording position, of a control mechanism comprising a cylinder, a piston within said cylinder and defining therewith pressure compartments of unequal cross-sectional area adjacent to opposite ends of said cylinder, means for applying fluid pressure to said compartments to create predetermined pressure conditions therein, said piston being disposed adjacent to one end of said cylinder when the pressure conditions within said compartments are balanced and movable toward the opposite end of said cylinder in response to a pressure differential in said compartments, an arm associated with said piston and control member, said arm being operative to move said control member from non-recording position to a recording position in response to movement of said piston from one end of said cylinder toward its opposite end, and valve means associated with said cylinder for controlling the pressure conditions in said compartments.

12. In a system of the character described, the combination with a meter having a control member movable from non-recording position to a recording position, of a control mechanism comprising a cylinder having a bore which is larger adjacent to one end than it is adjacent to the opposite end and an opening intermediate its ends, a piston slidable within said cylinder and having a pair of heads with diameters corresponding respectively to the diameters of the bore of said cylinder, a duct adjacent to each end of said cylinder, an arm connected to said control member and projecting through said opening into the path of movement of said piston, said arm being operative to move said control member from non-recording position to a recording position in response to movement of said piston from one end of said cylinder toward its opposite end, and a valve associated with one of said ducts.

13. In a system of the character described, the combination with a meter having a control shaft rotatable from a non-recording position to a recording position, of a control mechanism comprising a cylinder having an enlarged bore adjacent to one end and an opening intermediate its ends, a piston slidable within said cylinder and having spaced heads corresponding in diameter to the bore of said cylinder at opposite ends, a fluid duct communicating with each end of said cylinder, an arm mounted on said control shaft and normally disposed with its free end projecting through said opening into the path of movement of said piston, said arm being operative to rotate said control shaft from non-recording position to a recording position in response to movement of said piston from one end of said cylinder to its opposite end, and a valve associated with each duct.

14. In a system of the class described, the combination with a control member movable from one position to another, of a control mechanism comprising a pair of cylinders of different diameters, pistons movable within said cylinders from one end to the other, connecting means between said pistons constructed and arranged so that when one of said pistons is at one end of one cylinder the other piston is at the opposite end of the other cylinder, means for applying fluid pressure to each of said cylinders to create balanced pressure conditions therein, valves associated with one of said cylinders and operative to effect unbalanced pressure conditions therein, and means constituting a mechanical connection between one of said pistons and control member operative to move the latter from one position to another in response to movement of the former.

15. In a system of the class described, the combination with a control member movable from one position to another, of a control mechanism comprising a pair of opposed aligned cylinders of different diameters, pistons slidable within said cylinders, a rigid connection between said pistons, means for applying fluid pressure to each of said cylinders to create balanced pressure conditions therein, a valve associated with one of said cylinders and operative to effect unbalanced pressure conditions therein, and means constituting a mechanical connection between one of said pistons and said control member operative to move the latter from one position to another in response to movement of the former.

16. The comibnation with a motor vehicle having a meter or the like device provided with a control member movable from an inoperative position to an operative position, of a control system comprising a pressure chamber, a pipe line connecting said chamber and the intake manifold of the motor, thereby to create a predetermined pressure condition within said chamber when the motor is running, a valve in said pipeline, said valve being associated with one of the seats in the vehicle and operative in response to the occupancy of the seat to open said line and effect a change in said predetermined pressure condition within said chamber, means movable from one position to another in response to a change in said predetermined pressure condition within said chamber, and connections between said movable means and control member operative to move the latter from inoperative position to operative position in response to a change in said predetermined pressure condition.

17. The combination with a motor vehicle having a meter or the like device provided with a control member movable from an inoperative position to an operative position, of a control system comprising a cylinder, a piston member within said cylinder defining pressure compartments therein, pipe lines connecting each of said compartments with the intake manifold of the motor, thereby to create predetermined pressure conditions within said compartments when the motor is running, said piston member being movable from one position to another in response to a relative change in said predetermined pressure conditions, connections between said piston member and control member operative to move the latter from one position to another in response to movement of the former, and a valve associated with a seat in said vehicle and connected in one of said lines, said valve being operative in response to occupancy of the seat to open said line and thus effect a relative change in said predetermined pressure conditions.

18. A control system for a taximeter having a flag shaft rotatable from non-recording position to a recording position, comprising a cylinder adjoining the housing of the taximeter, a piston member operable within said cylinder and defining therewith pressure compartments of unequal cross-sectional area, a fluid pressure supply communicating with said compartments and operable to create predetermined pressure conditions therein, said piston member being disposed in normal position when said predetermined pressure conditions prevail and being movable from normal position to extended position in response to a change in said predetermined pressure conditions, an arm mounted on the flag shaft and disposed in the path of movement of said piston member when the shaft is in non-recording position, and valve means disposed in the communication between said compartments and fluid pressure supply, said valve means being operable to effect a change in said predetermined pressure conditions, thereby to cause the movement of said piston member to extended position and consequent actuation of the meter.

19. In a control system for a vehicle having a meter provided with a control shaft rotatable from non-recording to recording position, the combination of an arm on said shaft pneumatically actuated means operable in response to the occupancy of one of the seats in the vehicle to engage said arm to effect rotation of said shaft from non-recording to recording position, and manually operable means for rotating said shaft independently of said pneumatically actuated means, said manually operable means comprising a ratchet provided with a slot having a straight edge and a beveled edge, means for rotating said ratchet, a spring-pressed plunger carried by said arm and engageable with said slot, the straight edge of said slot being arranged to engage said plunger so that rotation of said ratchet effects rotation of said shaft from non-recording position to a recording position, and means engageable with said arm to prevent said shaft from being rotated to non-recording position when said seat of the vehicle is occupied.

20. Control means for a motor-vehicle taximeter provided with manually actuable setting mechanism, said control means comprising a movable stop element, and pneumatic means operative to move said stop element from a normal inoperative position to an operating position in response to the mutual effect of motor operation and the presence of a passenger in the vehicle, said stop element when in operating position being disposed to obstruct a part of the setting mechanism whereby to prevent manual setting of the taximeter such that it will fail to record chargeable use of the vehicle.

21. Control means for a motor-vehicle taximeter provided with manually actuable setting mechanism, said control means comprising a movable stop element, and fluid pressure means operative to move said stop element from a normal inoperative position to an operating position in response to the mutual effect of motor operation and the presence of a passenger in a vehicle, said fluid pressure means including fluid conduits, and being constructed and arranged also to respond to leakage of said conduits irrespective of occupancy of the vehicle by a passenger, said stop element, when in operating position, being disposed in the path of a part of the setting mechanism so as to prevent any manual setting of the taximeter such that it will fail to record chargeable use of the vehicle.

22. Control means for a motor-vehicle taximeter provided with manually actuable setting mechanism, said setting mechanism including a signal flag shaft and pawl and ratchet connections between said flag shaft and a setting shaft, the control means comprising a movable stop element and means operative to move said stop element from a normal inoperative position to an operating position in response to the mutual effect of motor operation and the presence of a passenger in the vehicle, said stop element when in operating position being disposed positively to prevent movement of the setting shaft in response to movement of the flag shaft such as would cause the taximeter to fail to record chargeable use of the vehicle.

23. A control system for a vehicle having a taximeter provided with a control member movable from a non-recording position to a recording position and manually actuable setting mechanism, said system comprising an elongate reciprocatory member slidably mounted for movement from a normal inoperative position to an operating position, an arm connected to said control member, said arm projecting into the path of movement of said reciprocatory member when in inoperative position, and means for moving said reciprocatory member from normal inoperative position to an operating position in response to the occupancy of one of the seats of said vehicle, thereby to effect movement of said arm and control member to a recording position, said reciprocatory member being so constructed and arranged that when in its operating position it obstructs movement of said arm and control member from a recording position to non-recording position, whereby to prevent manual setting of the taximeter such that it will fail to record chargeable use of the vehicle.

24 A control system for a vehicle having a taximeter provided with a control member movable from a non-recording position to a recording position and manually actuable setting mechanism, said system comprising a reciprocatory member mounted for movement from a normal inoperative position to an operating position, said reciprocatory member having a recessed portion intermediate its ends, an arm connected to said control member, the end of said arm projecting into said recessed portion when said control member is in inoperative position, and means for moving said reciprocatory member from normal inoperative position to an operating position in response to the occupancy of one of the seats of said vehicle, thereby to effect movement of said arm and control member to a recording position, said reciprocatory member being so constructed and arranged that when in operating position it obstructs movement of said arm and control member from a recording position to non-recording position, whereby to prevent manual setting of the taximeter such that it will fail to record chargeable use of the vehicle.

25. Control means for a motor-vehicle taximeter provided with a control member and manually actuable setting mechanism, said control means comprising a stop element movable from an inoperative position to an operating position to effect movement of said control member from a non-recording position to a recording position, and means operative to move said stop element from inoperative position to operating position in response to the conjoint effect of motor operation and the presence of a passenger in the vehicle, said stop element being so constructed and arranged that when in operating position it obstructs movement of said control member from a recording position to a non-recording, thereby to prevent manual setting of the taximeter such that it will fail to record a chargeable use of the vehicle.

26. Control means for a vehicle having a taximeter provided with a control shaft and manually actuable setting mechanism, said control means comprising a reciprocatory member movable from a normal inoperative position to an operating position in response to the occupancy of one of the seats of the vehicle, said reciprocatory member having a recessed portion intermediate its ends, and an arm mounted on said control shaft and having a part which projects into the recessed portion of said reciprocatory member, said arm being operative to rotate said control shaft from non-recording position to a recording position in response to movement of said reciprocatory member from inoperative position to operating position, said reciprocatory member and arm being so constructed and arranged that when said reciprocatory member is in operating position it obstructs movement of said arm and control shaft from a recording position to a non-recording, thereby to prevent manual setting of the taximeter such that it will fail to record chargeable use of the vehicle.

27. Control means for a motor-vehicle taximeter having a control member and manually actuable setting mechanism, said control means comprising a stop element movable from an inoperative position to an operating position thereby to effect movement of said control member from non-recording position to a recording position, pneumatic means operative to move said stop element from inoperative position to operating position in response to the occupancy of one of the seats of the vehicle, said stop element when in operating position being disposed to obstruct movement of said control member, thereby to prevent manual setting of the taximeter such that it will fail to record chargeable use of the vehicle, and pneumatic means operative upon the vacating of said seat to restore said stop element to inoperative position, whereby to permit the manual operation of said setting mechanism to restore said control member to non-recording position.

28. The combination with a meter having a control shaft rotatable from non-recording position to a recording position, of control means comprising an arm on said shaft, a rotatable ratchet member having a slot provided with a straight edge and a beveled edge, means for rotating said ratchet, a spring-pressed plunger carried by said arm and engageable with said slot, the straight edge of said slot being arranged to engage said plunger so that rotation of said ratchet causes rotation of said shaft, and a stop element engageable with said arm and operative to prevent reverse movement of said control shaft from a recording position back to non-recording position, said beveled edge being effective to disengage said plunger from said slot upon an attempted reverse movement of said shaft from recording position to non-recording position.

29. The combination with a meter having a control shaft rotatable from non-recording position to a recording position, of control means comprising an arm on said shaft, a rotatable ratchet member having a slot, means for rotating said ratchet, a spring-pressed plunger carried by said arm and engageable with said slot so that rotation of said ratchet causes rotation of said shaft, a stop element movable from an inoperative position to an obstructing position wherein it engages said arm and prevents rotation of said control shaft from a recording position to a non-recording position, and means for restoring said stop element to inoperative position.

JOHN B. PARSONS.